(12) United States Patent
Enk

(10) Patent No.: US 11,241,599 B2
(45) Date of Patent: Feb. 8, 2022

(54) FIRE SUPPRESSION SYSTEM

(71) Applicant: William A. Enk, Key Largo, FL (US)

(72) Inventor: William A. Enk, Key Largo, FL (US)

( * ) Notice: Subject to any disclaimer, the term of this patent is extended or adjusted under 35 U.S.C. 154(b) by 99 days.

(21) Appl. No.: 16/268,089

(22) Filed: Feb. 5, 2019

(65) Prior Publication Data

US 2019/0344109 A1 Nov. 14, 2019

Related U.S. Application Data

(60) Provisional application No. 62/669,273, filed on May 9, 2018.

(51) Int. Cl.
*A62C 37/36* (2006.01)
*A62C 13/76* (2006.01)

(52) U.S. Cl.
CPC .............. *A62C 37/04* (2013.01); *A62C 13/76* (2013.01)

(58) Field of Classification Search
CPC ........... A62C 5/02; A62C 5/022; A62C 5/024; A62C 5/027; A62C 5/006; A62C 19/00; A62C 35/08; A62C 37/04; A62C 37/08; A62C 37/28; A62C 13/76; F41H 9/08; F42B 12/40
See application file for complete search history.

(56) References Cited

U.S. PATENT DOCUMENTS

| | | | | |
|---|---|---|---|---|
| 366,901 A * | 7/1887 | Van Houten | ........... | A62C 35/08 169/28 |
| 648,371 A * | 5/1900 | Allen | ...................... | A62C 35/08 169/28 |
| 695,847 A * | 3/1902 | Van Valkenburg | .... | A62C 35/08 169/28 |
| 744,061 A * | 11/1903 | Fry | ......................... | A62C 35/08 169/28 |
| 1,832,056 A * | 11/1931 | Spencer | ................... | A62C 3/00 169/26 |
| 1,904,828 A * | 4/1933 | Green | ..................... | A62C 37/10 169/39 |
| 2,719,589 A * | 10/1955 | Mapes | ................... | A62C 13/22 169/9 |
| 2,908,334 A * | 10/1959 | Duggan | ................ | A62C 5/002 169/44 |
| 3,019,843 A * | 2/1962 | Powell | ..................... | A62C 3/06 169/56 |
| 3,174,550 A * | 3/1965 | Bugg | ...................... | C10L 1/006 169/44 |
| 3,217,456 A * | 11/1965 | Quigg | .................... | E04B 1/944 52/423 |

(Continued)

*Primary Examiner* — Steven M Cernoch

(74) *Attorney, Agent, or Firm* — Husch Blackwell LLP

(57) ABSTRACT

A fire suppression system for a use in a fire zone is provided. The fire suppression system includes a case, a fire extinguishing container, a battery assembly, a control assembly and a sensor device. The sensor device is configured to detect a potential fire hazard within the fire zone and signal the discharge of a fire extinguishing material outside the case and into the fire zone upon the detection of a potential fire hazard. The fire suppression system can further include a smoke generating container configured to release a smoke generating agent outside of the fire zone upon the detection of a potential fire hazard in order notify operators and systems of a potential fire hazard occurring within the fire zone.

17 Claims, 11 Drawing Sheets

(56) References Cited

U.S. PATENT DOCUMENTS

| | | | | |
|---|---|---|---|---|
| 3,523,583 A * | 8/1970 | Morrisette | A62C 99/009 | 169/28 |
| 3,604,511 A * | 9/1971 | Griffith | A62C 35/08 | 169/28 |
| 3,796,377 A * | 3/1974 | O'Hare | E03C 1/084 | 239/428.5 |
| 3,799,270 A * | 3/1974 | Boud | A62C 13/003 | 169/28 |
| 3,834,463 A * | 9/1974 | Allard | A62C 37/10 | 169/28 |
| 4,250,967 A * | 2/1981 | Horwinski | A24F 19/09 | 169/11 |
| 4,319,640 A * | 3/1982 | Brobeil | A62C 35/02 | 169/28 |
| 4,322,292 A * | 3/1982 | Knox | E03C 1/084 | 239/428.5 |
| 4,330,086 A * | 5/1982 | Nysted | B05B 7/0068 | 169/5 |
| 4,351,394 A | 9/1982 | Enk | | |
| 4,411,318 A * | 10/1983 | Zeischegg | A62C 3/00 | 169/26 |
| 4,557,961 A * | 12/1985 | Gorges | B32B 3/12 | 428/117 |
| 4,566,542 A * | 1/1986 | Enk | A62C 3/08 | 137/266 |
| 4,691,783 A * | 9/1987 | Stern | G08B 17/00 | 169/19 |
| 4,760,886 A * | 8/1988 | Sassier | A62C 35/08 | 169/28 |
| 4,779,683 A * | 10/1988 | Enk | A62C 35/02 | 169/28 |
| 4,805,700 A * | 2/1989 | Hoover | A62C 31/12 | 169/14 |
| 4,981,178 A | 1/1991 | Bundy | | |
| 5,038,866 A * | 8/1991 | Kern | A62C 35/08 | 169/26 |
| 5,050,683 A * | 9/1991 | Sayles | A62C 35/08 | 169/35 |
| 5,052,585 A * | 10/1991 | Bolduc | B65D 83/687 | 222/1 |
| 5,056,603 A * | 10/1991 | Parkinson | A62C 3/00 | 169/26 |
| 5,113,945 A * | 5/1992 | Cable | A62C 5/02 | 169/14 |
| 5,119,877 A * | 6/1992 | Sapko | A62C 3/02 | 169/28 |
| 5,153,722 A * | 10/1992 | Goedeke | G08B 17/125 | 169/61 |
| 5,226,555 A * | 7/1993 | Kovaleski | B65D 5/566 | 206/521 |
| 5,232,053 A * | 8/1993 | Gillis | A62C 37/40 | 169/28 |
| 5,330,105 A * | 7/1994 | Kaylor | A62C 31/12 | 137/889 |
| 5,337,913 A * | 8/1994 | Fukuda | E05C 19/06 | 220/326 |
| 5,423,385 A * | 6/1995 | Baratov | A62C 5/00 | 169/12 |
| 5,425,426 A * | 6/1995 | Baratov | A62D 1/0014 | 169/12 |
| 5,441,114 A * | 8/1995 | Spector | A62C 5/006 | 169/14 |
| 5,588,493 A * | 12/1996 | Spector | A62C 99/0018 | 169/46 |
| 5,609,210 A * | 3/1997 | Galbraith | A62C 35/023 | 169/26 |
| 5,610,359 A * | 3/1997 | Spector | A62C 5/006 | 89/1.11 |
| 5,717,001 A * | 2/1998 | Books | C08J 9/0019 | 521/146 |
| 5,718,294 A * | 2/1998 | Billiard | A62C 35/08 | 169/61 |
| 5,779,158 A * | 7/1998 | Baker | B05B 7/0018 | 169/15 |
| 5,806,603 A * | 9/1998 | Schaefers | A62C 3/0292 | 169/12 |
| 5,826,664 A * | 10/1998 | Richardson | A62C 35/08 | 169/46 |
| 5,996,700 A * | 12/1999 | Sulmone | A62C 5/02 | 169/15 |
| 6,189,625 B1 * | 2/2001 | Hopkins | A62C 13/64 | 169/30 |
| 6,217,788 B1 * | 4/2001 | Wucherer | A62C 5/006 | 149/17 |
| 6,241,164 B1 * | 6/2001 | Wolfe | A62C 5/022 | 169/27 |
| 6,413,668 B1 * | 7/2002 | Sandberg | H01M 10/0413 | 429/174 |
| 6,513,602 B1 * | 2/2003 | Lewis | A62C 5/006 | 149/19.1 |
| 6,622,801 B1 * | 9/2003 | Rondino | A62C 5/006 | 169/71 |
| 6,810,966 B1 * | 11/2004 | Bauer | A62C 35/023 | 169/58 |
| 6,851,483 B2 * | 2/2005 | Olander | A62C 5/00 | 169/26 |
| 7,070,003 B1 * | 7/2006 | Smith | A62C 3/00 | 169/16 |
| 7,108,074 B2 * | 9/2006 | Thomann | F41H 9/06 | 169/33 |
| 7,121,354 B2 * | 10/2006 | Munson, Jr. | A62C 35/023 | 169/47 |
| 7,143,834 B2 * | 12/2006 | Dolan | A62C 37/11 | 169/37 |
| 7,147,061 B2 * | 12/2006 | Tsutaoka | A62C 8/005 | 169/28 |
| 7,163,642 B2 | 1/2007 | Hagquist et al. | | |
| 7,232,197 B2 * | 6/2007 | Davis | E05G 1/024 | 312/409 |
| 7,334,644 B1 | 2/2008 | Ozment | | |
| 7,385,480 B2 * | 6/2008 | Fitzpatrick | A62C 99/0045 | 169/58 |
| 7,455,120 B2 * | 11/2008 | Richardson | A62C 5/006 | 169/12 |
| 8,146,674 B2 * | 4/2012 | Lee | G21F 7/00 | 169/61 |
| 8,159,356 B2 * | 4/2012 | Farrell | H01L 35/32 | 340/577 |
| 8,408,322 B2 * | 4/2013 | Blau | A62C 13/22 | 169/30 |
| 8,540,421 B2 * | 9/2013 | Ahlers | G01M 99/002 | 374/8 |
| 8,544,670 B2 * | 10/2013 | Brilmyer | H01M 2/127 | 220/88.1 |
| 8,733,465 B1 * | 5/2014 | Flood | A62C 3/16 | 169/62 |
| 8,800,672 B2 * | 8/2014 | Cerfeuillet | A62C 35/023 | 169/9 |
| 8,939,225 B2 * | 1/2015 | Cox | A62C 5/006 | 169/72 |
| 8,967,284 B2 * | 3/2015 | Sampson | A62C 5/006 | 169/44 |
| 8,973,670 B2 * | 3/2015 | Enk, Sr. | A62C 35/023 | 169/14 |
| 9,155,927 B2 * | 10/2015 | Newton | A62C 37/38 | |
| 9,339,671 B1 * | 5/2016 | Raj | A62C 3/16 | |
| 9,381,388 B2 | 7/2016 | Enk, Sr. | | |
| 9,393,451 B2 * | 7/2016 | Broidy | A62C 33/04 | |
| 9,415,248 B2 * | 8/2016 | Donahue | A62C 99/0009 | |
| 9,421,405 B1 * | 8/2016 | Murray | C06C 9/00 | |
| 9,520,619 B2 * | 12/2016 | Bianchi | B65B 7/02 | |
| 9,550,195 B1 * | 1/2017 | Cao | B05B 1/18 | |
| 9,578,942 B2 * | 2/2017 | Brilmyer | A45C 11/00 | |
| 9,586,067 B1 * | 3/2017 | Kirkbride | A62C 13/62 | |
| 9,597,535 B2 * | 3/2017 | Knijnenburg | A62C 31/28 | |
| 9,604,081 B1 * | 3/2017 | Scarola | A62C 35/02 | |
| 9,643,036 B2 * | 5/2017 | Burkett | A62C 99/0009 | |
| 9,722,163 B2 * | 8/2017 | Firdosy | H01L 35/34 | |

(56) References Cited

U.S. PATENT DOCUMENTS

| | | | |
|---|---|---|---|
| 9,871,237 B2* | 1/2018 | Lu | H01M 2/1027 |
| 9,956,445 B2* | 5/2018 | Enk, Sr. | B05B 12/087 |
| 10,022,735 B2* | 7/2018 | Cao | B05B 1/341 |
| 10,363,446 B2* | 7/2019 | Lenkeit | A62C 35/13 |
| 2003/0062175 A1* | 4/2003 | Olander | A62C 35/023 169/51 |
| 2003/0066660 A1* | 4/2003 | Horwell | A62C 8/06 169/50 |
| 2005/0126794 A1* | 6/2005 | Palmer | A62C 3/0271 169/16 |
| 2005/0139365 A1* | 6/2005 | Richardson | A62C 5/006 169/43 |
| 2005/0257937 A1* | 11/2005 | Fabre | A62C 99/0018 169/5 |
| 2006/0138251 A1* | 6/2006 | Stahl | A62C 3/16 239/309 |
| 2006/0219416 A1* | 10/2006 | Fore | A62C 5/02 169/44 |
| 2007/0131794 A1* | 6/2007 | Lai | A62C 17/00 239/304 |
| 2007/0163787 A1* | 7/2007 | Posson | A62C 5/006 169/85 |
| 2007/0181715 A1* | 8/2007 | Hubert | A62C 31/12 239/589 |
| 2007/0246233 A1* | 10/2007 | Johnson | A62C 37/11 169/37 |
| 2008/0053667 A1* | 3/2008 | Rousseau | A62C 13/76 169/51 |
| 2008/0135266 A1* | 6/2008 | Richardson | A62C 99/0018 169/46 |
| 2008/0168798 A1 | 7/2008 | Kotliar | |
| 2008/0190627 A1* | 8/2008 | Koelewijn | A62C 5/006 169/46 |
| 2008/0289832 A1* | 11/2008 | Schimpf | A62C 35/08 169/51 |
| 2008/0289837 A1* | 11/2008 | Rouosseau | A62C 13/006 169/88 |
| 2008/0314602 A1* | 12/2008 | Lohnes | A62C 37/11 169/56 |
| 2009/0014188 A1* | 1/2009 | Hesch | H01M 2/1016 169/48 |
| 2009/0084561 A1* | 4/2009 | Popp | G01J 5/0066 169/60 |
| 2009/0301738 A1* | 12/2009 | Gross | A62C 99/0018 169/30 |
| 2009/0321094 A1* | 12/2009 | Thomas | A62C 3/025 169/70 |
| 2010/0012335 A1* | 1/2010 | Popp | B64D 25/00 169/46 |
| 2010/0025053 A1* | 2/2010 | Chesley | A62C 37/40 169/56 |
| 2010/0032175 A1* | 2/2010 | Boyd | A62C 5/022 169/44 |
| 2010/0170684 A1* | 7/2010 | Richardson | A62D 1/06 169/46 |
| 2011/0027500 A1* | 2/2011 | Hanna | B32B 5/22 428/12 |
| 2011/0079456 A1* | 4/2011 | Borumand | B32B 5/06 180/68.5 |
| 2011/0262801 A1* | 10/2011 | Schwab | B60K 1/04 429/163 |
| 2011/0308821 A1* | 12/2011 | Katsuraku | A62C 5/02 169/28 |
| 2012/0037717 A1* | 2/2012 | Zakhmatov | C02F 1/681 239/1 |
| 2012/0138319 A1* | 6/2012 | Demmitt | A62C 8/005 169/28 |
| 2012/0211246 A1* | 8/2012 | Zlatintsis | A62C 13/76 169/85 |
| 2012/0231317 A1* | 9/2012 | Shimizu | H01M 10/613 429/120 |
| 2012/0273240 A1* | 11/2012 | Smith | A62C 3/00 169/70 |
| 2013/0048317 A1* | 2/2013 | Charlton | F42B 12/50 169/46 |
| 2013/0112439 A1* | 5/2013 | Cordani | A62C 99/0009 169/44 |
| 2013/0118765 A1* | 5/2013 | Smith | A62C 35/08 169/61 |
| 2013/0175058 A1* | 7/2013 | Williams | A62C 3/006 169/46 |
| 2013/0199806 A1* | 8/2013 | Zimmerman | A62C 5/022 169/53 |
| 2013/0206428 A1* | 8/2013 | Phillips | A62C 37/11 169/16 |
| 2013/0220651 A1* | 8/2013 | Rachidi | A62C 13/76 169/85 |
| 2013/0307270 A1* | 11/2013 | Steen | F03D 17/00 290/44 |
| 2014/0178742 A1* | 6/2014 | Krahn | H01M 2/022 429/151 |
| 2014/0196916 A1* | 7/2014 | Lee | A62C 5/006 169/28 |
| 2014/0196918 A1* | 7/2014 | Effenberger | A62C 13/70 169/85 |
| 2014/0209332 A1* | 7/2014 | Burkett | A62C 3/00 169/49 |
| 2014/0216766 A1* | 8/2014 | Qiang | A62C 5/006 169/28 |
| 2014/0352988 A1* | 12/2014 | Aldino | A62C 99/0018 169/48 |
| 2015/0060093 A1* | 3/2015 | Bongiornio | A62C 13/72 169/85 |
| 2015/0069068 A1* | 3/2015 | Hariram | A62C 3/16 220/560.01 |
| 2015/0283523 A1* | 10/2015 | Clausen | B01F 5/0619 366/152.1 |
| 2015/0343246 A1* | 12/2015 | Santos Gomez | A62C 35/023 156/382 |
| 2015/0357541 A1* | 12/2015 | Firdosy | H01L 35/32 136/205 |
| 2016/0175628 A1* | 6/2016 | Nadeau | A62C 35/023 169/46 |
| 2016/0263410 A1* | 9/2016 | Enk, Sr. | A62C 5/024 |
| 2016/0263411 A1* | 9/2016 | Chung | A62C 13/003 |
| 2016/0303409 A1* | 10/2016 | Smith | A62C 35/13 |
| 2016/0315361 A1* | 10/2016 | Petzinger | A62C 3/00 |
| 2016/0346578 A1* | 12/2016 | Szocs | A62C 35/023 |
| 2016/0361580 A1* | 12/2016 | Leahy | A62C 37/36 |
| 2017/0043194 A1* | 2/2017 | Ling | A62C 37/08 |
| 2017/0077379 A1* | 3/2017 | Firdosy | H01L 35/08 |
| 2017/0087393 A1* | 3/2017 | Butler | A62C 99/0027 |
| 2017/0155103 A1* | 6/2017 | Pasewald | H01M 10/54 |
| 2018/0147431 A1* | 5/2018 | Chattaway | A62C 37/40 |
| 2018/0147432 A1* | 5/2018 | An | E04C 5/0622 |
| 2018/0243596 A1* | 8/2018 | Kim | F16L 41/03 |
| 2018/0355989 A1* | 12/2018 | Bedell | F16K 27/12 |
| 2019/0168037 A1* | 6/2019 | Lian | A62D 1/0071 |
| 2019/0168038 A1* | 6/2019 | Lian | A62D 1/0071 |
| 2019/0185163 A1* | 6/2019 | Thomas | A62C 37/00 |
| 2019/0290948 A1* | 9/2019 | Mahrt | A62C 5/022 |
| 2019/0348649 A1* | 11/2019 | Ryu | H01M 2/10 |
| 2019/0366138 A1* | 12/2019 | Mull | A62C 35/62 |

\* cited by examiner

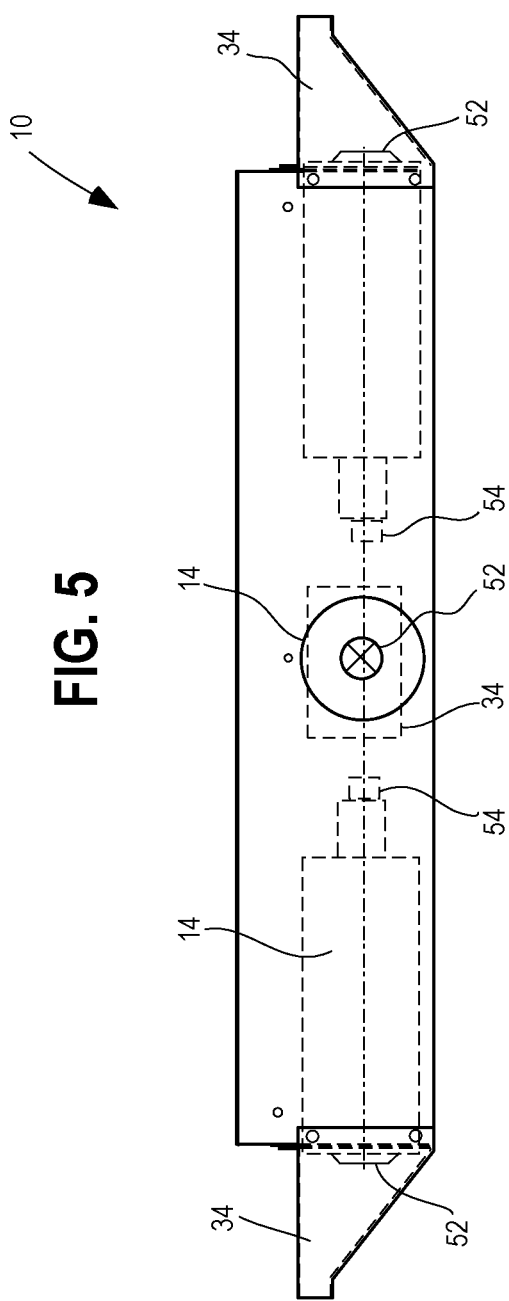
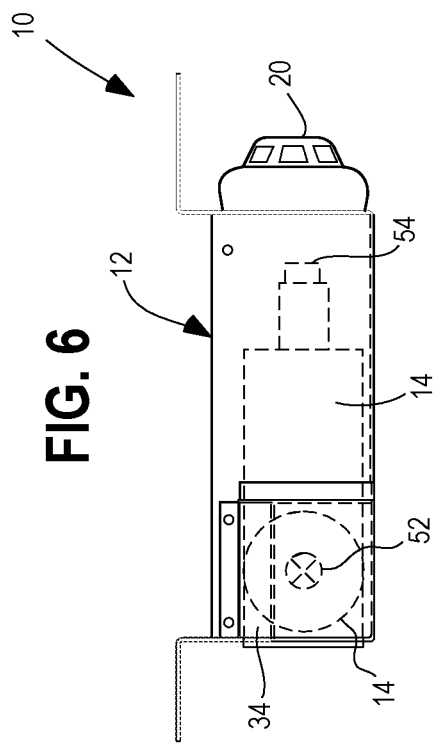

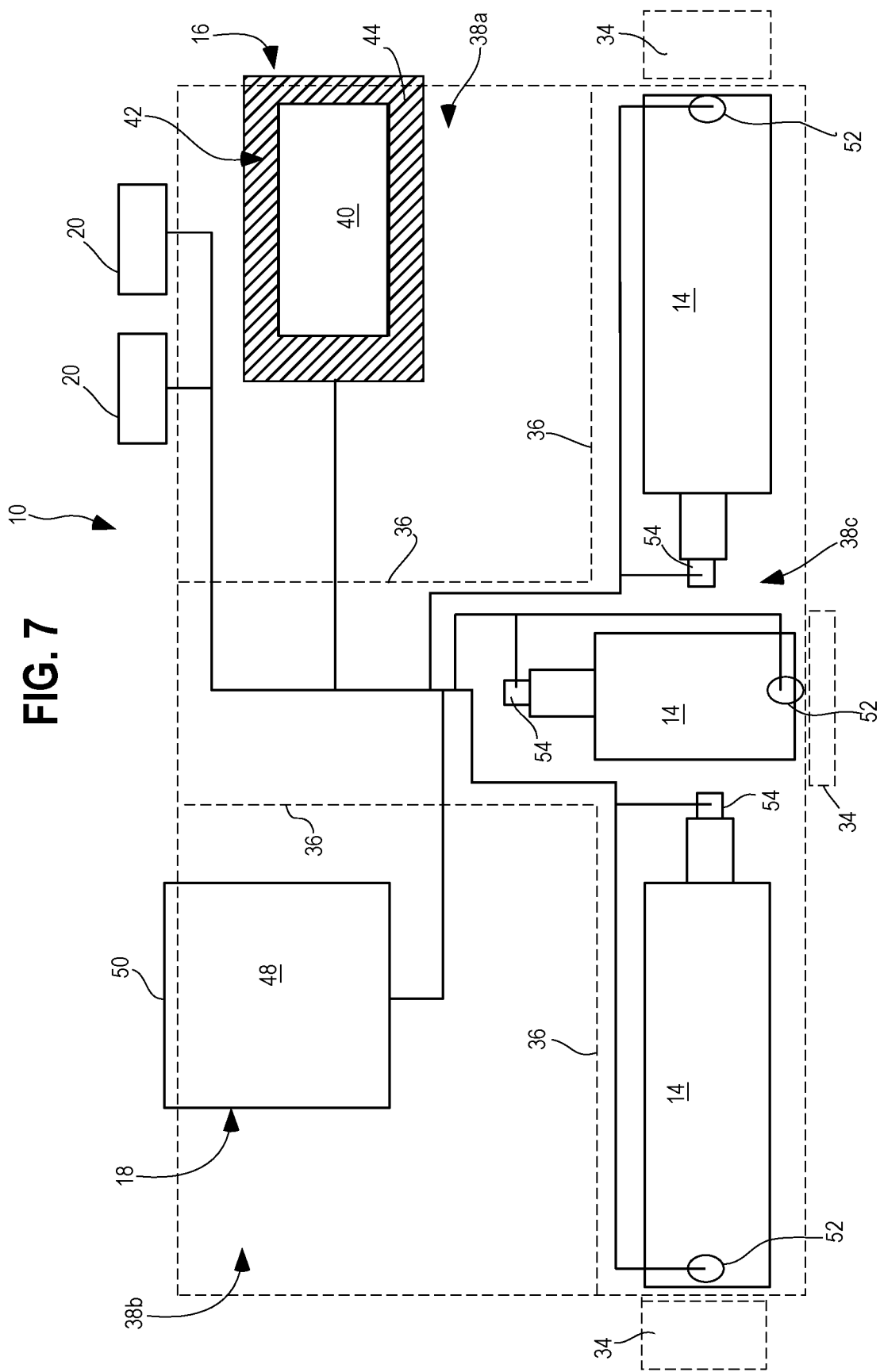

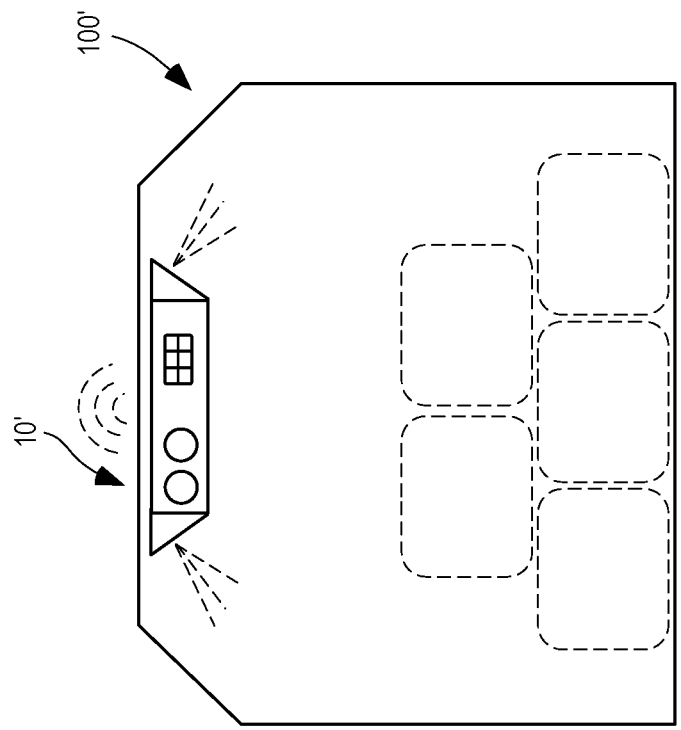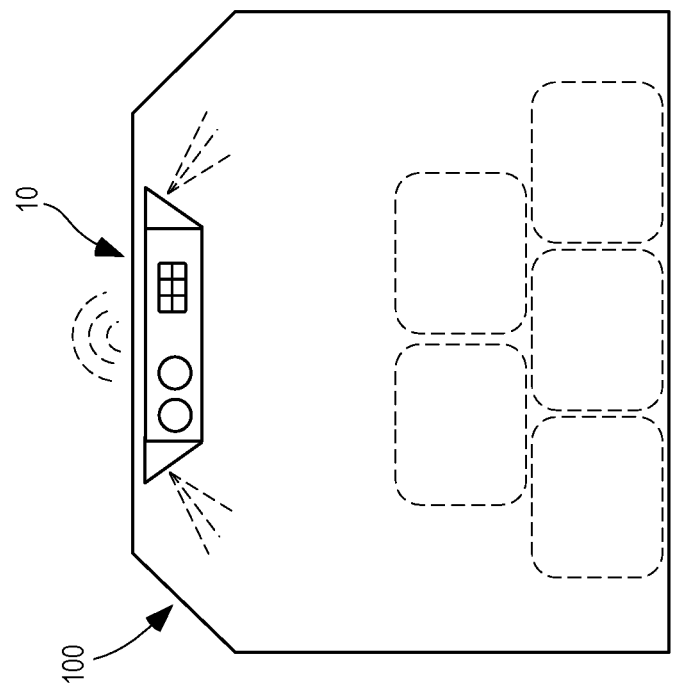
FIG. 12

FIRE SUPPRESSION SYSTEM

CROSS-REFERENCE TO RELATED APPLICATIONS

This Application claims priority to U.S. Provisional Patent Application No. 62/669,273 having a filing date of May 9, 2018, the entire disclosure of which is incorporated herein by reference.

BACKGROUND OF THE INVENTION

Fire protection and extinguishing systems are commonly implemented in areas where there are concerns of potential fire hazards. Such fire protection systems are particularly important in cargo compartments for aircrafts, freight carriers and other transports because they carry potentially hazardous, combustible and/or flammable cargo that can cause a fire hazard or fuel an already existing fire hazard. Traditional fire protection systems for cargo compartments are typically permanently installed systems located within the cargo compartment and designed to discharge a fire extinguishing material throughout the entire cargo compartment upon the detection of a fire. They are usually intended to cover the burning cargo inside the cargo compartment and create an oxygen-depriving medium, create an inert atmosphere inside the cargo compartment, create a cooling medium, such as provided by water misting technology, or retard a fire's propagation.

However, these traditional built-in systems pose cost and reliability concerns. The costs to develop, certify, and maintain built-in systems are often substantial. The reliability of some of these built-in systems is unknown unless developed and analyzed simultaneously with a proper Safety Assessment. Further, cargo compartments (and the cargo contained therein) are typically subject to very rough treatment and storage conditions, thus requiring fire-extinguishing systems to be protected and durable and not susceptible to damage as result of inadvertent contact during loading, unloading and transport of the cargo in the cargo compartment.

In addition, cargo is often transported through the use of individual cargo containers, often called unit load devices (ULDs). These ULDs are loaded with cargo and then transferred into the cargo compartment of the aircraft, freight carrier or other transport. As a result, in the event of a fire caused by certain cargo, the fire occurs within a specific ULD and thus a fire protection system installed within the cargo compartment is an ineffective and inefficient fire protection means.

Thus, there is a need in the art for a fire extinguishing system that is lightweight, self-contained, durable and easily movable, and that can be selectively placed in a ULD (or similar container) that is loaded into a cargo compartment and poses an increased risk of a potential fire hazard. Further, there is a need in the art for such a fire extinguishing system that incorporates appropriate battery protection means in compliance with FAA requirements and other federal, state and local rules and regulations.

Similarly, semi-trucks, trailers and other transportation vehicles commonly have cargo and materials that pose a fire risk. Thus, there is a need in the art for a fire extinguishing system that can be configured to be installed in the trailers of semi-trucks to protect the cargo and contents of the trailer. Further, as more and more cars and trucks are being offered with a hybrid or all electronic drive systems, there is a concern of the battery bundles being ignited and burning after a crash, a particular shortcoming has been observed in side impact collisions. Once the lithium (or other long range) batteries are exposed or broken, there is the chance of spontaneous ignition and the fires of these metals are very difficult to extinguish. Thus, there is a need in the art for a fire extinguishing system that can adequately contain and extinguish such a fire in over-the-road trailers and the battery enclosures of hybrid or electric cars. Yet further, electronic housings, warehouses, storage facilities, wind turbines, and the like can also house or contain cargo, inventory or materials that pose a fire risk. Thus, there is a need in the art for a fire extinguishing system that can adequately contain and suppress a fire and protect in these areas.

The aforementioned problems and needs similarly apply to many other situations where fire protection is a concern. For example, wind turbines have electrical, battery storage and mechanical compartments at risk of starting a fire within the wind turbine. Storage units and facilities, particularly battery storage units, are also susceptible to fires. Such units and facilities are commonly used to house a large number of batteries configured for storing the energy generated by wind turbines and solar panels. Thus, a need exists for a fire suppression system capable of suppressing fires started in these wind turbines, storage units and facilities along with many other types of accessible or inaccessible fire zones.

BRIEF SUMMARY OF THE INVENTION

The present invention is directed toward a fire suppression system that can be placed in a fire zone, such as a Unit Load Device (ULD) or similar cargo container on aircraft and transport systems, or other fire zones where fire protection is desired. According to one embodiment, the fire suppression system of the present invention can comprise a self-contained, automated system that can passively operate to detect a potential fire hazard present in the fire zone where it is located and discharge a fire extinguishing material into the ULD or fire zone to fight the fire hazard. According to one embodiment, the fire suppression system of the present invention can include a case having a control assembly, a battery assembly, a sensor device and one or more fire extinguishing containers containing a volume of fire extinguishing agent. The sensor device, control assembly, battery assembly and fire extinguishing containers can be electrically connected to one another in order to enable the continuous and passive operation of the fire suppression system. Upon the detection of smoke and or heat, the sensor device can be configured to signal the one or more fire extinguishing containers to discharge the fire extinguishing material housed therein outside of the case and into the fire zone in order to suppress and/or extinguish the fire hazard.

According to another embodiment of the present invention, the fire suppression system can also be configured for discharging a smoke generating agent outside of the fire zone to alert operators and systems outside of the fire zone of a potential fire hazard. According to such an embodiment, the fire suppression system can include one or more fire extinguishing containers containing a fire extinguishing agent and one or more smoke generator containers containing a smoke generating agent. The fire suppression system can further include at least one smoke/heat detector in electronic communication with a triggering device that acts to discharge the fire extinguishing agent and the smoke generating agent simultaneously.

The fire suppression system of the present invention can include numerous configurations of regulators, valves, and shut-off valves that can be optimized to result in the performance characteristics desired by the operator of the fire suppression system. These valves or regulators may be automatically controlled to result in operation of the system at will or as a result of being triggered by the presences of smoke and or rapid heat change, or by any other triggering mechanism now known or hereafter developed, including an impact switch similar to those used to release automotive airbags during a crash.

The fire suppression system can be used in ULDs, cargo compartments of delivery vehicles and transports, or other cargo containers as well as any type of accessible or inaccessible fire zone, for example and without limitation, battery housings, compartment housings, equipment housings, storage facilities and systems, warehouses, buildings, enclosed spaces, open spaces or any other regions or areas that can be defined as a potential fire zone or plurality of fire sub-zones. Other embodiments may be similarly configured to match the needs of the particular freight moving vehicles or vehicles carrying components that have a unique fire risk including: cars, hybrid or electric cars, over-the-road trucks, boats, trains, barges, planes, vans, or any other vehicle or enclosure used to contain or transport materials.

The fire suppression system of the present invention can be configured to be connected to or otherwise communicate with external power sources, electronic systems, communications systems, alarm systems and other systems or equipment located outside of a fire zone in order to utilize a secondary or backup power supply, and/or to alert or otherwise communicate with systems and operators outside of the fire zone as to the status of the fire suppression system and fire zone.

The fire suppression system of the present invention can also be configured to be connected to or otherwise communicate with additional sensor devices and/or fire extinguishing containers remotely located within a fire zone, and additional fire suppression systems located within the fire zone. Such embodiments can enable the fire suppression system of the present invention to effectively be utilized in fire zones having larger volumes.

The fire suppression system of the present invention can also be configured to be connected to or otherwise communicate with additional fire suppression systems located in other fire zones. For example, where a cargo transport or storage facility contains multiple individual and separate fire zones, a fire suppression system can be placed within each individual fire zone and the multiple fire suppression systems can be placed into communication with one another so that the discharge of one fire suppression system can be communicated to the other fire suppression systems in the other individual fire zones.

Other aspects and advantages of the present invention will be apparent from the following detailed description of the preferred embodiments and the accompanying drawing figures.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views:

FIG. 5 is a schematic rear elevation view of the fire suppression system of FIG. 4;

FIG. 6 is a schematic side view of the fire suppression system of FIG. 4;

FIG. 7 is a schematic plan view of a fire suppression system in accordance with one embodiment of the present invention;

FIG. 12 is a schematic view of a multiple fire suppression systems in operation within separate fire zones in accordance with one embodiment of the present invention.

DETAILED DESCRIPTION OF THE INVENTION

The following description of the invention illustrates specific embodiments in which the invention can be practiced. The embodiments are intended to describe aspects of the invention in sufficient detail to enable those skilled in the art to practice the invention. Other embodiments can be utilized and changes can be made without departing from the scope of the present invention.

Figure 9:
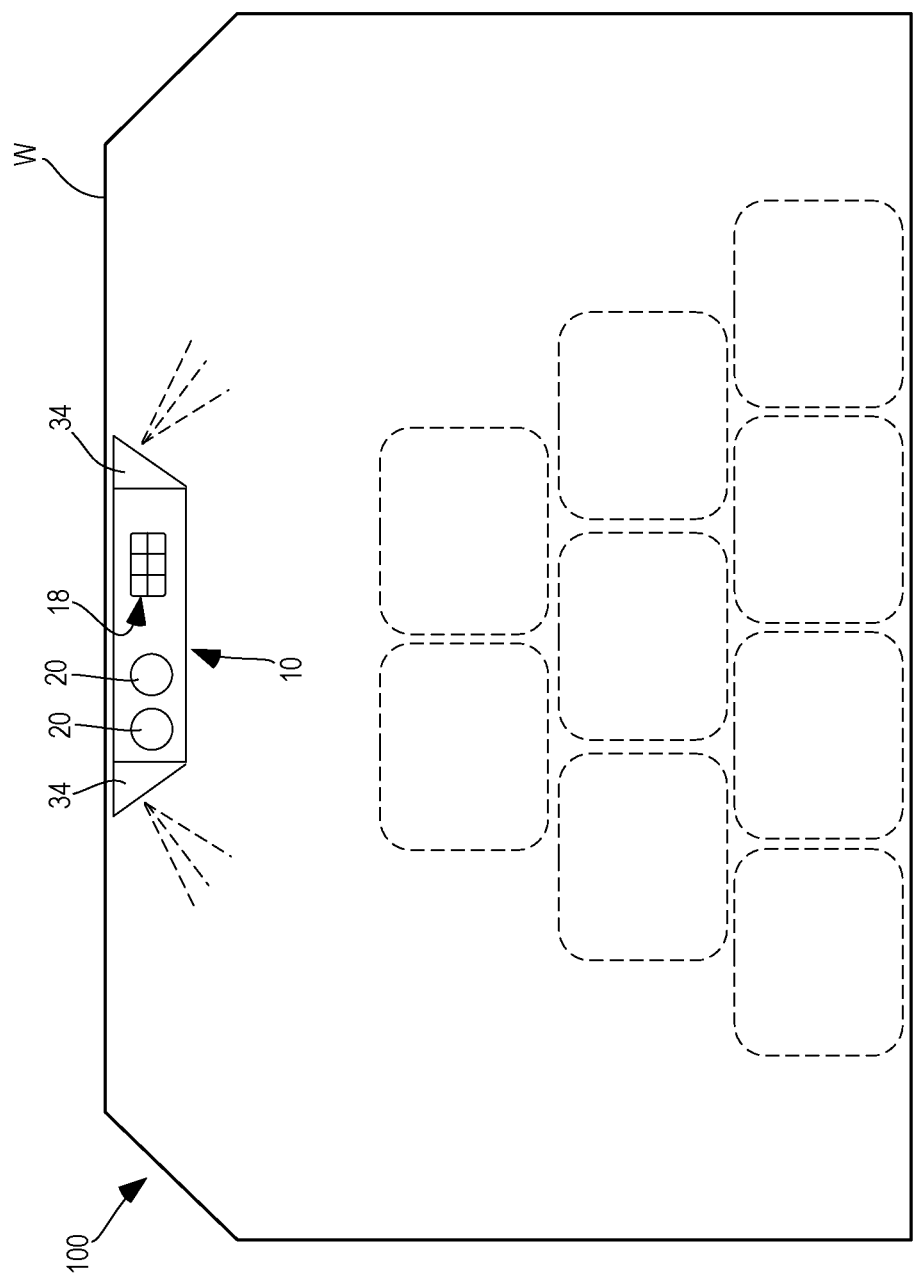
FIG. 9 is a schematic view of the fire suppression of FIG. 7 illustrating the fire suppression system in operation within a fire zone in accordance with one embodiment of the present invention.
Figure 10:
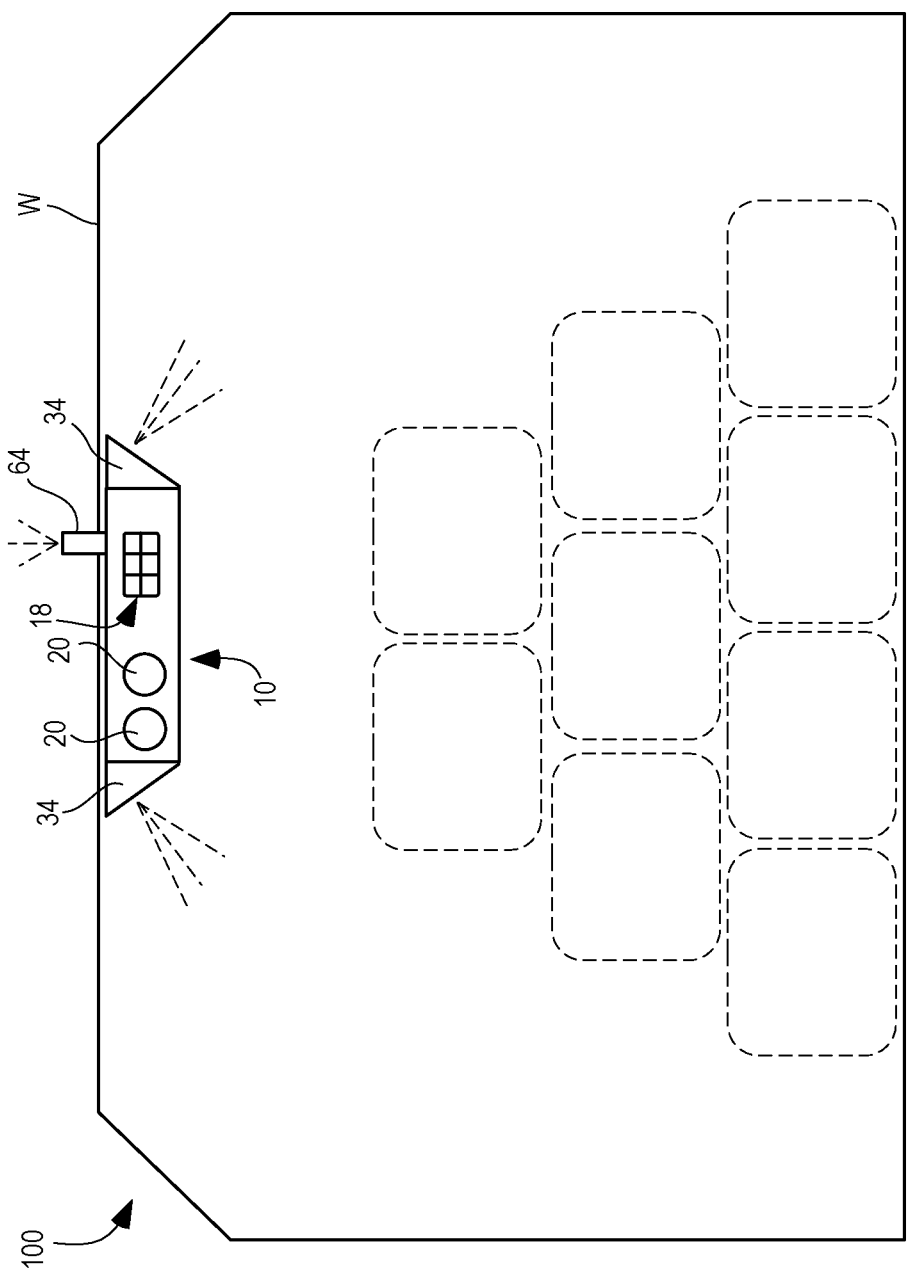
FIG. 10 is a schematic view of the fire suppression system of FIG. 8 illustrating the fire suppression system in operation within a fire zone in accordance with one embodiment of the present invention.

The present invention is directed to a fire suppression system 10 that can configured and utilized to contain a fire hazard within any type of defined area (herein referred to as a fire zone). Fire suppression system 10 of the present invention can be positioned within a fire zone 100 (as illustrated in FIGS. 9 and 10 and described in greater detail below) and then subsequently upon the detection of a potential fire hazard can be configured to reduce, suppress, and/or extinguish the potential fire hazard within the fire zone 100. As described herein, fire suppression system 10 can be further configured as a self-contained, autonomously operating system that passively monitors a fire zone 100 for the existence of a potential fire hazard and automatically operates upon the detection of a potential fire hazard within the fire zone 100. As described in greater detail below, upon the detection of a potential fire hazard (such as but not limited to detecting the presence of smoke, heat and/or combustible gases), fire suppression system 10 can be configured to automatically discharge a fire extinguishing material into the fire zone 100 to suppress and fight a fire hazard through oxygen deprivation, char formation, or other means. In addition, as described in greater detail below, according to certain embodiments, fire suppression system 10 can be configured to generate and discharge a smoking agent outside of the fire zone 100 in order to alert operators and monitoring systems outside of the fire zone 100.

As used herein, a fire zone 100 can be any type of defined space or area where a potential fire hazard may occur, including but not limited to transportation compartments, shipping containers, cargo containers, delivery vehicles or transports, battery compartments (such as those used in electric vehicles), equipment housings, engine compartments, turbine compartments, storage facilities and warehouses, factories, buildings, and maintenance rooms. Fire suppression system 10, according to the embodiments described herein and illustrated in FIGS. 9 and 10, is described as being used within a fire zone 100 configured as a unit load device (ULD), which is cargo container used on aircraft and transport systems, however, it is recognized that fire suppression system 10 according to one or more different embodiments may be utilized in any number of different types of fire zones 100.

Referring to FIGS. 1-6, fire suppression system 10 according to one embodiment of the present invention can include an exterior case 12, one or more fire extinguishing containers 14 configured for discharging a fire extinguishing material into the fire zone 100, a battery assembly 16 configured to power fire suppression system 10, and a control assembly 18 configured to control the operation of fire suppression system 10. Fire extinguishing containers 14, battery assembly 16 and control assembly 18 can each be positioned and contained within exterior case 12 and be placed in electric communication to one another through standard wiring and circuitry. As further shown in FIGS. 1-6, fire suppression system 10 can include one or more smoke and/or heat sensors 20 provided on the exterior of exterior case 12 and configured for detecting the presence of heat and/or smoke. Sensors 20 can also be in electric communication with control unit 18 (and optionally extinguishing containers 14 and battery assembly 16) to relay the detection of smoke and/or heat to the remaining components of fire suppression system 10.

Figure 1:
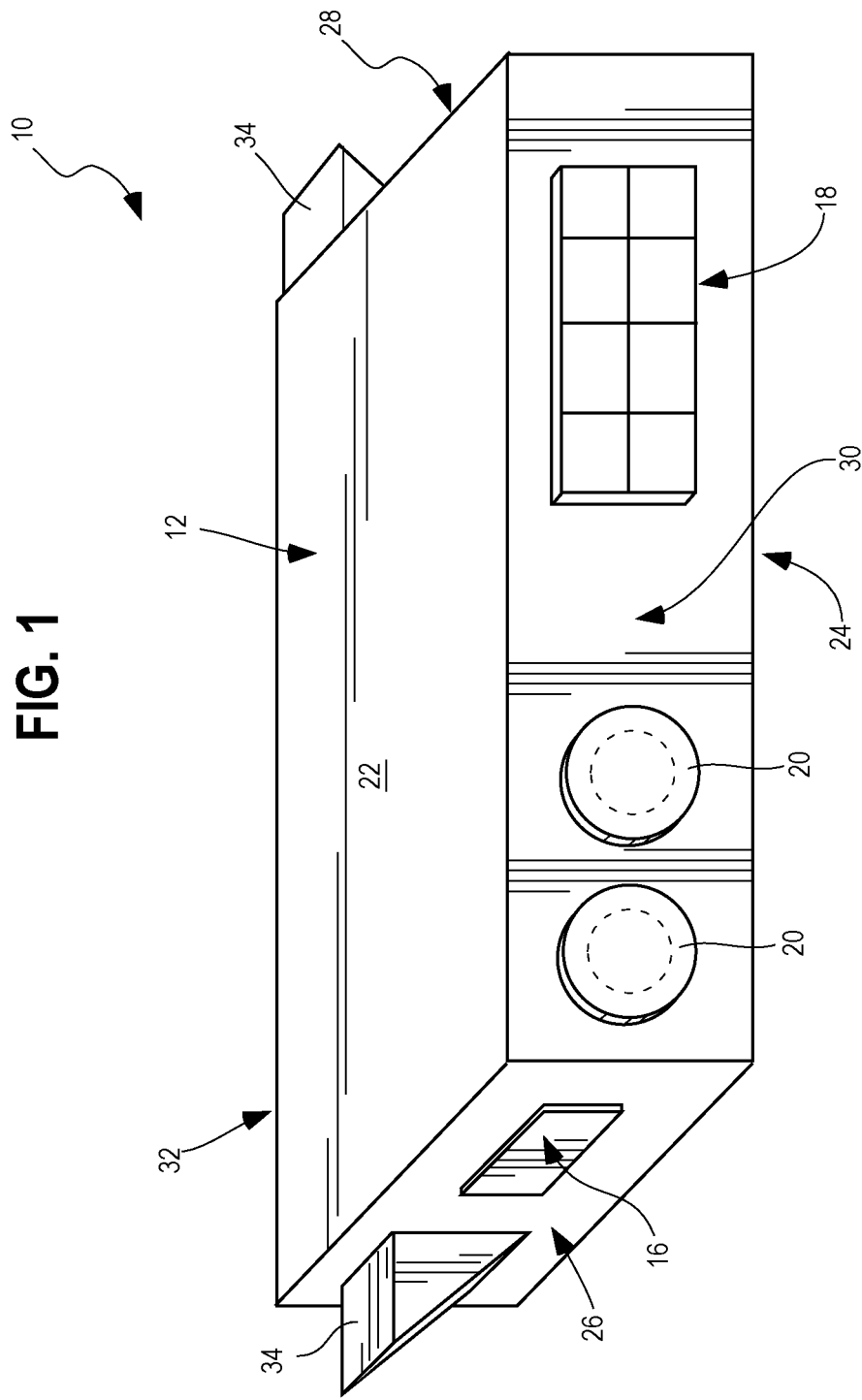
FIG. 1 is a schematic perspective view a fire suppression system in accordance with one embodiment of the present invention.
Figure 2:
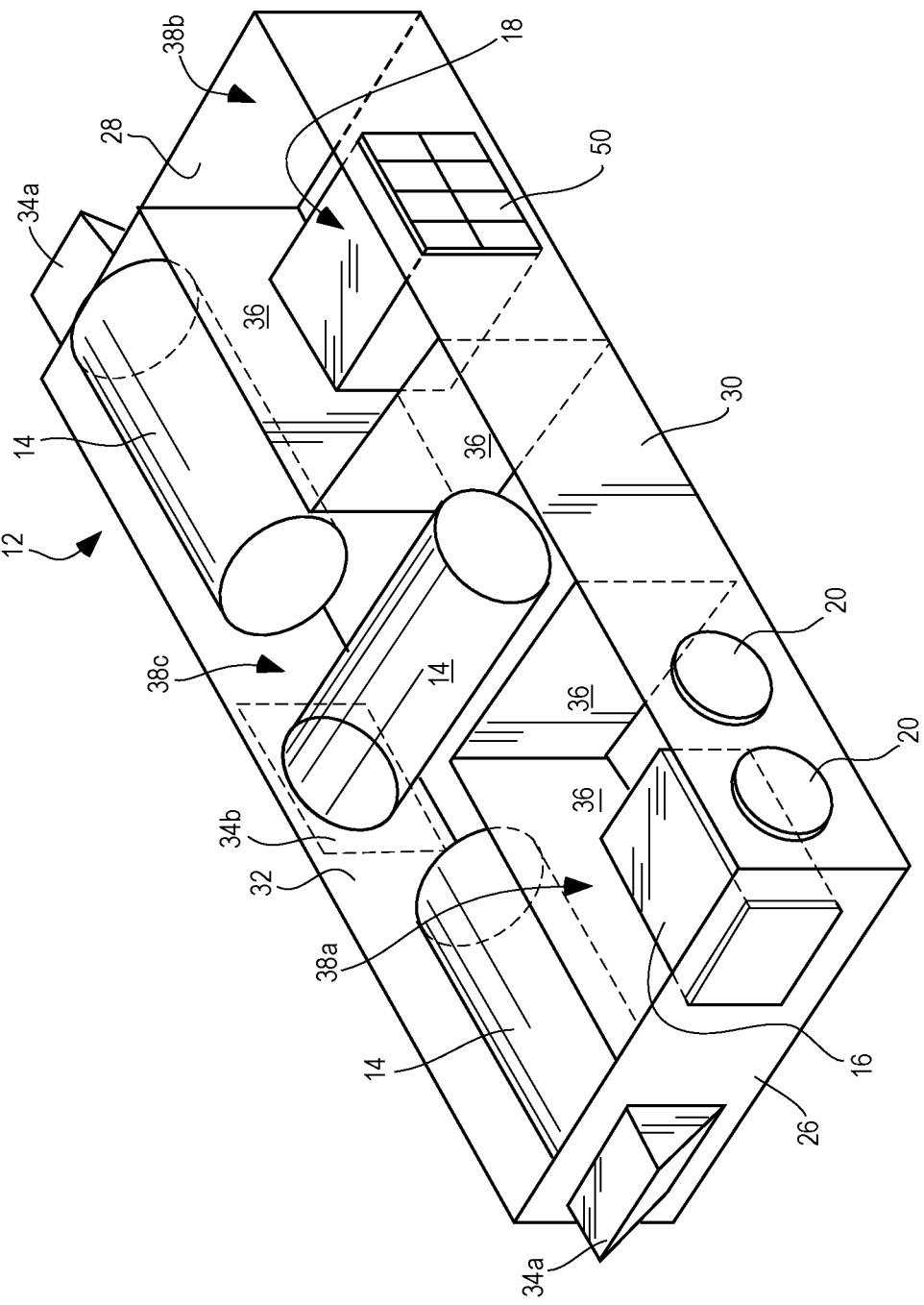
FIG. 2 is a schematic front perspective view of the fire suppression system of FIG. 1 illustrating the interior components of the fire suppression system in accordance with one embodiment of the present invention.
Figure 3:
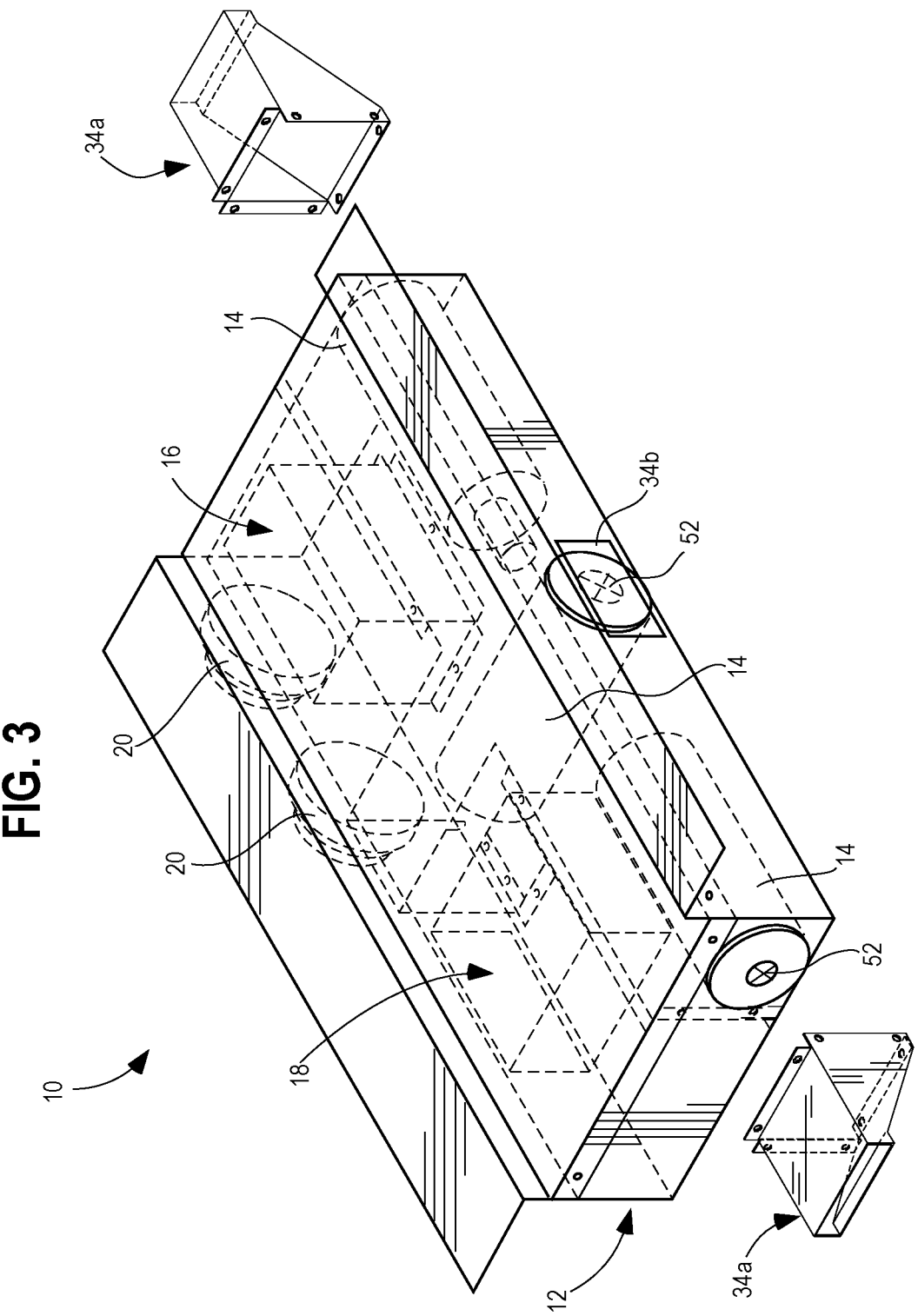
FIG. 3 is a schematic rear perspective view of the fire suppression system of FIG. 1 illustrating the interior components of the fire suppression system in accordance with one embodiment of the present invention.

As shown in FIGS. 1-6, exterior case 12 of fire suppression system 10 can be configured to house the several working components (including but not limited to fire extinguishing containers 14, battery assembly 16, and control assembly 18) of fire suppression system 10. As best shown in FIG. 1, according to one embodiment exterior case 12 can include a top panel 22, bottom panel 24, first and second side panels 26 and 28, and first and second end panels 30 and 32. Depending on the particular embodiment of fire suppression system 10, one or more of panels 22-32 of exterior case 12 may be absent as long as exterior case 12 includes at least one panel 22-32 for holding or otherwise securing the components of fire suppression system 10 within or on exterior case 12. As further shown in FIG. 1, exterior case 12 can include one or more vents, baffles and/or nozzles 34 provided through one or more of the panels 22-32 in order to direct the flow of the extinguishing material from fire extinguishing containers 14 to the outside of case 12 and into fire zone 100 as during operation of fire suppression system 10 as described in greater detail below. As best shown in FIGS. 2-3, baffles 34 can be configured as directional baffles (shown as 34a) or non-directional baffles (shown as 34b) depending on the desired discharge direction and pattern of extinguishing material from fire suppression system 10.

Exterior case 12 can be constructed from any desired material, including but not limited to any suitable durable materials and/or fire-resistant materials to maintain the structure and strength of fire suppression system 10 during prolonged use and operation. For example, case 12 can be constructed of steel, aluminum, titanium, carbon fiber, polymer, polyethylene, composite, or any other known industrial material that can be formed or molded to any desired shape and size. Exterior case 12 can also be configured to fully contain the components of fire suppression system 10 in order to enable fire suppression system 10 to be easily and efficiently moved, transported, installed, mounted, removed and stored. Exterior case 12 may also include one or mounting brackets or components (not shown) for securing case 12 within the fire zone 100 depending on the particular embodiment of the present invention (see FIGS. 9 and 10). Exterior case 12 can effectively enclose and contain fire suppression system 10 within a single container and enable fire suppression system 10 to be easily mobile for simple transportation, use and set-up. When in use, fire suppression system 10 may be transported to a fire zone 100 and installed or positioned within the fire zone 100 and then left in place. Once installed, fire suppression system 10 can continuously and passively monitor the fire zone 100 for the presence of a potential fire hazard and activate in the event a potential fire hazard is detected. When fire suppression system 10 is no longer needed or desired to be removed, fire suppression system 10 can then be simply removed from the fire zone 100 by de-mounting fire suppression system 10 and removing it from fire zone 100 and no further assembly/de-assembly is required.

Figure 4:
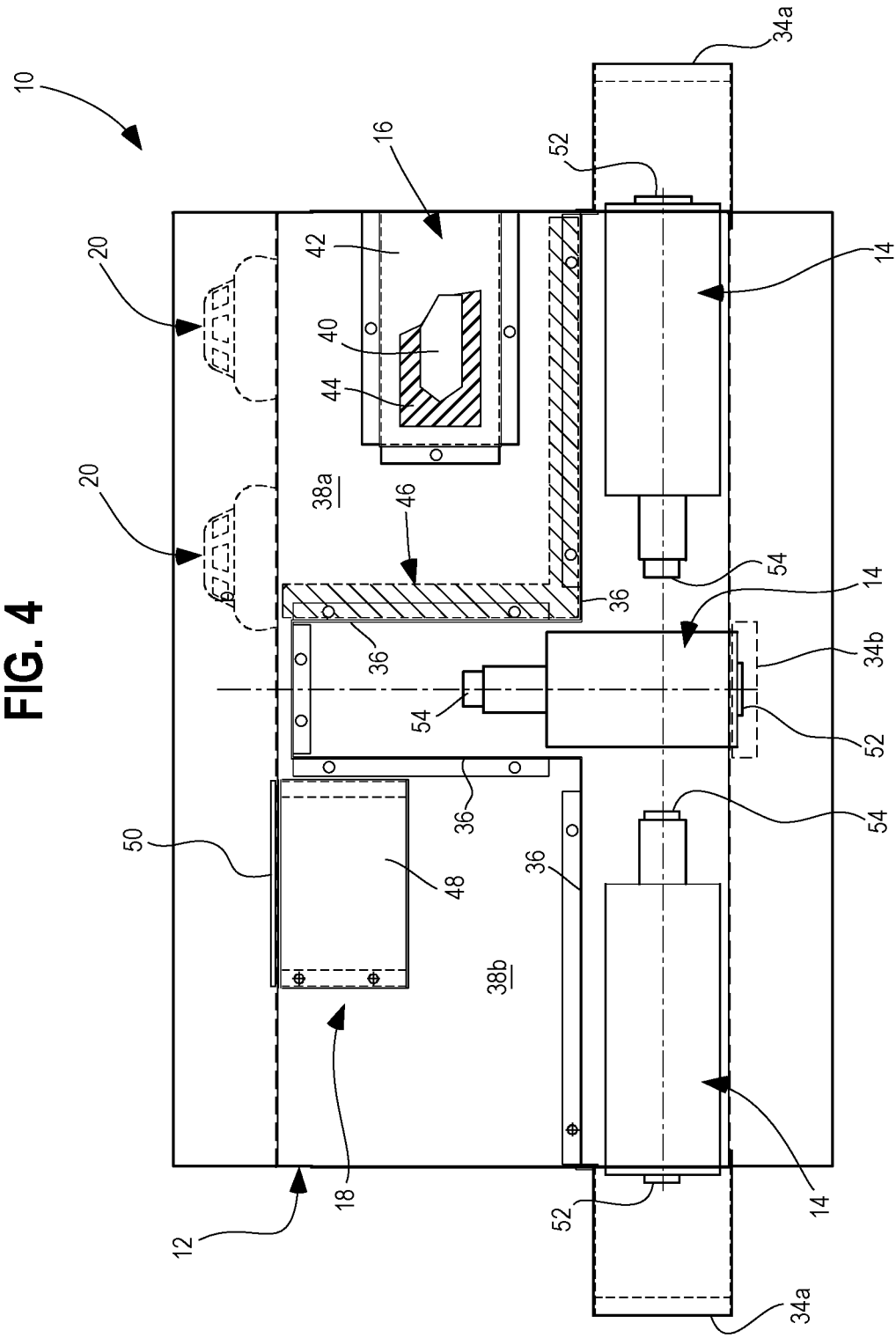
FIG. 4 is a schematic plan view of a fire suppression system in accordance with one embodiment of the present invention.

As best shown in FIGS. 2-4, according to one embodiment, fire suppression system 10 can include one or more partition panels 36 located within the interior of exterior case 12 in order to partition or divide the interior of case 12 into two or more case compartments 38. Partition panels 36 can be configured to separate particular components of fire suppression system 10, such as but not limited to fire extinguishing containers 14, battery assembly 16 and control assembly 18. As shown in FIGS. 2-4, according to one embodiment, fire suppression system 10 can include a battery compartment 38a, a control unit compartment 38b, and a fire extinguishing compartment 38c configured to separate fire extinguishing containers 14, battery assembly 16 and control assembly 18, respectively. In alternative embodiments, fire suppression system 10 can include any number of additional case compartments 38 depending on the desired application and/or use of fire suppression system 10.

Referring to FIGS. 2-4, battery assembly 16 can be configured with any suitable type of battery component or power source for providing power to operate fire suppression system 10 and its several components. According to one embodiment, as best illustrated in FIG. 4, battery assembly 16 can include a battery unit 40 configured to provide the necessary power and voltage to operate fire suppression system 10 and a battery box or container 42 configured enclose and hold battery unit 40. According to one embodiment, battery unit 40 can be configured as a rechargeable lithium iron phosphate battery module with one or more battery cells; however it is recognized that any other suitable battery or power source type may be utilized in other embodiments of the present invention. When comprised of a lithium iron phosphate battery module, battery unit 40 can have the advantage of not containing any flammable materials that can catch fire or explode due to the fact that the case, electrodes, terminals, substrate, active material (i.e., $LIFEPO_4$) and electrolyte are not flammable. This can reduce the risk that battery assembly 16 could malfunction and cause a fire within fire suppression system 10 and/or catch fire or explode in the event of a potential fire hazard within the fire zone 100 in which fire suppression system 10 is located. In addition, by utilizing a rechargeable battery unit 40, battery unit 40 can be recharged as needed in order to prolong the lifespan of battery assembly 16 and fire suppression system 10.

Battery box 42 can be configured from any suitable material, and according to one embodiment, can include an insulating material 44 (such as but not limited to high temperature ceramic insulation) on one or more sides of the battery box 42 in order to protect battery unit 40 from elevated temperatures, dust, debris and damage and separate battery unit 40 from other combustible materials. In addition, battery box 42 can include one or more vents (not shown) provided through one or more sides of battery box 42 to allow for airflow and heat dissipation from battery unit 40.

As best shown in FIGS. 2-4, battery assembly 16 can be configured to be positioned within battery compartment 38a located within the interior of fire suppression system 10 and case 12. According to one embodiment, as illustrated in FIG. 4, battery assembly 16, and battery box 42 specifically can be secured to bottom panel 24 (or any of panels 22-32 or 36) of case 12 with battery unit 40 located therein. Battery unit 40 can further be configured to be selectively removable from battery box 42 while battery box 42 remains secured within battery compartment 38a. According to one embodiment, as best illustrated in FIGS. 2 and 4, one end of battery box 42 (and battery assembly 16 overall) can be generally aligned with first side panel 26 (or any of panels 22-32) with an opening extending through panel 26 (or other panel 22-32) to allow a user to remove battery unit 40 from battery box 42 and exterior case 12 so that battery unit 40 can be removed, changed and/or charged outside of exterior case 12 without having to remove the entire fire suppression system 10 from a fire zone 100.

As best shown in FIG. 4, in order to further protect battery assembly 16 and the components of fire suppression system 10, battery compartment 38a can include an insulating material 46 (such as but not limited to high temperature ceramic insulation) within battery compartment 38a along partition panels 36 in order to further protect battery assembly 16 and battery unit 40 from elevated temperatures, dust, debris and damage, separate battery assembly 16 and battery unit 40 from other combustible materials, and prevent battery unit 40 from becoming an ignition source in the event of thermal runaway of battery unit 40. While not shown in the several figures, in certain embodiments, fire suppression system 10 can also include insulating material 46 on one or more of panels 22-32 for additional heat, damage and thermal runaway protection.

As best shown in FIGS. 2-4, the configuration of battery assembly 16 within fire suppression system 10 can effectively isolate the battery unit 40 from any combustible material in the fire zone 100 as well as any combustible material contained within other parts of fire suppression system 10. As described above and shown in FIGS. 2-4, battery unit 40 can be encased within insulating material 44 and battery box 42, which itself is isolated from the remaining components of fire suppression system 10 and any cargo or potentially combustible materials within fire zone 100 by partition panels 36 and additional insulating material 46. As a result, this configuration isolates battery unit 40, which can prevent battery unit 40 from becoming the source of a fire within the fire zone 100 or inside fire suppression system 10. In addition, as described above, battery unit 40 can be configured as a rechargeable battery and battery assembly 16 can be configured to enable the selective removal of battery unit 40 from fire suppression system 10. This can enable battery unit 40 to be removed from fire suppression system 10 for recharging and then re-inserted into fire suppression system 10 after battery unit 40 has been fully recharged, which can eliminate the risk that a malfunction during charging of battery unit 40 can cause a potential fire within fire suppression system 10 and comply with FAA and other regulations and requirements that restrict the recharging of battery modules aboard an aircraft.

Referring again to FIGS. 1-6, control assembly 18 can be located within control unit compartment 38b in order to separate from the other internal components of fire suppression system 10. As best shown in FIGS. 2-4, according to one embodiment, control assembly 18 can include a control unit 48 removably secured to one or more of panels 24-34. As best shown in FIGS. 2-4, according to one embodiment, control assembly 18 can include a control display 50 that is visible from and/or located along the exterior of first end panel 30 (or any of panels 24-34) to enable an operator of fire suppression system 10 to view and check the status of fire suppression system 10. While not shown in the figures, according to one embodiment, control display 50 of control assembly 18 is angled downward relative to front end panel 30. Such a configuration can enable an operator to easily view control display 50 when fire suppression system 10 is mounted from the ceiling of a fire zone 100.

Control unit 48 can be configured as any standard electronic control unit and can be configured to, among other items, turn the fire suppression system ON/OFF, perform Press-to-Test to verify fire extinguishing containers 14 are functioning properly and display status of fire extinguishing containers 14, and check and display battery unit 40 power status. Control assembly 18 can further be configured with electrical harnesses (including without limitation, printed circuit boards and components, wiring and associated connectors, terminals, relays, circuit breakers, fuses, and grounds) to electrically connect control assembly 18, and control unit 48 specifically, to battery assembly 16 and each of the one or more fire extinguishing containers 14.

Referring again to FIGS. 1-6, fire suppression system 10 can include one or more fire extinguishing containers 14 located within the interior of case 12. As best shown in FIG. 4, according to one embodiment fire suppression system 10 can include three fire extinguishing containers 14; however, a greater or lesser number of fire extinguishing containers 14 can be utilized in fire suppression system 10 depending on the particular application and size of fire zone 100. In addition, the fire extinguishing containers 14 can be configured to hold any suitable amount of fire extinguishing material in order to effectively extinguish or suppress a potential fire hazard located within a particular fire zone 100. According to one embodiment, as shown in FIGS. 2-4, fire extinguishing containers 14 can be provided within fire extinguishing compartment 38c in order to separate fire extinguishing containers 14 from control assembly 18 and battery assembly 16. Each fire extinguishing container 14 can be configured as a tank or canister holding a volume of fire extinguishing/suppressing material and can be sized to provide enough volume of the agent to effectively extinguish/suppress a fire hazard occurring within a fire zone 100. The fire extinguishing material can be any suitable type of chemical agent or material now known or hereinafter developed that suitable for extinguishing or suppressing a fire, including without limitation, aerosol-based chemical agents.

As best shown in FIGS. 2-4, each fire extinguishing container 14 can include a discharge end positioned adjacent to a discharge baffle 34 on panels 22-32 of case 12 so that the fire extinguishing material can exit case 12 into fire zone 100 upon activation of fire suppression system 10. Each fire extinguishing container 14 removably secured within case 10 (such as by straps or other suitable means) and can be selectively removable from case 12 so that the fire extinguishing containers 14 can be replaced as needed.

As best illustrated in FIGS. 3-4 (schematically in FIGS. 7-8), each fire extinguishing container 14 can include a distribution outlet 52 (such as a nozzle or discharge conduit) located at the discharge end of the fire extinguishing container 14 and configured to discharge the fire extinguishing agent outside of case 12 and into the fire zone 100 upon detection of a potential fire hazard as described in greater detail below. As further shown in FIGS. 3-4 (as well as schematically FIGS. 7-8), in order to facilitate the discharge of the fire extinguishing agent outside of case 12, each fire extinguishing container 14 can be positioned with its distribution outlet 52 located adjacent to an exterior wall panel 22-32 so that the fire extinguishing agent can be effectively discharged outside of case 12 and into fire zone 100.

Figure 8:
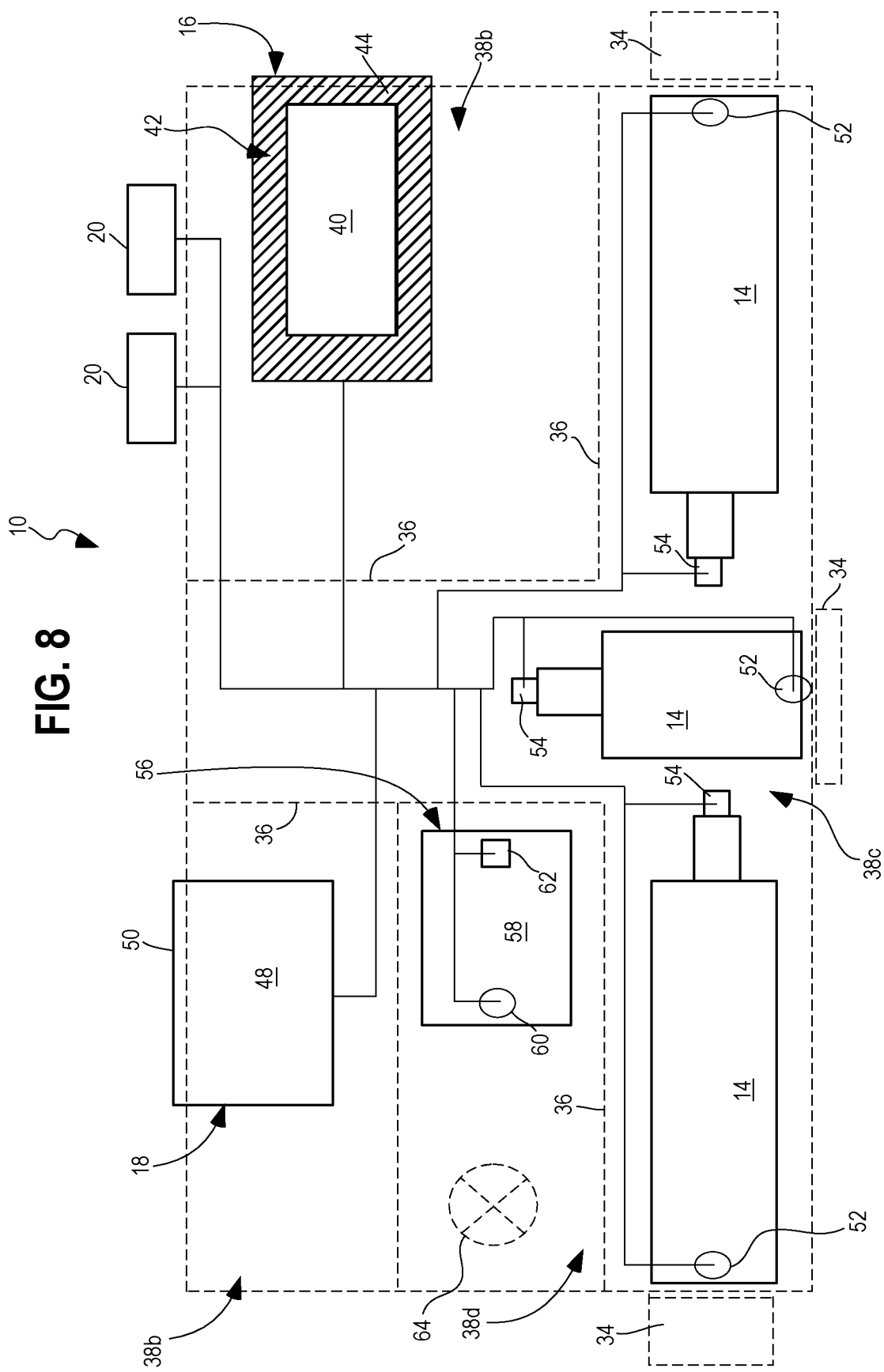
FIG. 8 is a schematic plan view of a fire suppression system in accordance with another embodiment of the present invention.

As also illustrated in FIGS. 4-5 and schematically in FIGS. 7-8, each fire extinguishing container 14 can include a release device 54, such as a squib or servo control (or other suitable mechanism) provided on fire extinguishing container 14. Release device 54 can be configured to initiate the discharge of the fire extinguishing material from fire extinguishing container 14 (via distribution outlet 52) upon a signal from control assembly 18 and/or sensor devices 20. Depending on the particular embodiment, release device 54 can operate electrically, thermally or other suitable means to initiate the fire extinguishing material discharge. According to one embodiment, release device 54 can be connected to distribution outlet 52 and operate to open distribution outlet 52 upon the signal from control assembly 18 and/or sensor devices 20. According to another embodiment, release device 54 is configured as part of extinguishing container 14 and is configured to activate the fire extinguishing material within container 14 and cause the discharge of the fire extinguishing material through distribution outlet 52 upon the signal from control assembly 18 and/or sensor devices 20. In addition, according to certain embodiments of the present invention, release device 54 can be configured as a thermal bulb that ignites the fire extinguishing material within fire extinguishing container 14 upon reaching a specified temperature in order to cause the discharge of the fire extinguishing material through distribution outlet 52. Further, in certain embodiments of the present invention, fire extinguishing containers 14 can be configured so that the fire extinguishing material contained therein ignites upon reaching a specified temperature and causes the discharge of the fire extinguishing material through distribution outlet 54 even if not activated by release device 54. This configuration can provide redundant protection that will cause the discharge of the fire extinguishing material in fire extinguishing containers 14 during temperatures consistent with a potential fire hazard in the event of a malfunction of sensors 20 and/or release devices 54.

Referring again to FIGS. 1-6, fire suppression system 10 can include one or more heat/smoke sensor devices 20 for detecting smoke and/or heat present in a fire zone 100 resulting from a potential fire hazard. As best shown in FIGS. 1 and 2, sensor devices 20 can be mounted on the outside of case 12 to any of panels 22-32 in order to detect the presence of smoke and/or heat (or other characteristic associated with a potential fire hazard) within the fire zone 100. Sensor devices 20 can be configured as any suitable type of sensor component commonly used for sensing heat and/or smoke relating to fire hazards and protection and can include a protective covering or shell in certain applications. As illustrated schematically in FIGS. 7-8, sensor devices 20 can be in electronic communication with control assembly 18, battery assembly 16 and/or fire extinguishing containers 14 and can be configured to trigger the activation of fire extinguishing containers 14 (either directly or through control assembly 18) upon the detection of smoke and/or heat relating to a potential fire hazard within fire zone 100. According to one embodiment (as shown in FIGS. 7-8), sensor devices 20 can be electrically connected to each release device 54 (and/or distribution outlet 52) in order to signal the activation of release device 54 and the discharge of fire extinguishing material from containers 14 through distribution outlet 52. Sensor devices 20 can also (or alternatively) be electrically connected to control assembly 18, which can send a signal to activate release device 54 (which may be configured as a squib component or other suitable device as described herein) to discharge the fire extinguishing material from containers 14. In addition, according to certain embodiments (not shown), sensor devices 20 can be wirelessly connected to control assembly 18 and/or fire extinguishing containers 14 in order to enable sensor devices 20 to be located remotely from case 12.

FIG. 7 provides a schematic representation of fire suppression system 10 according to one embodiment of the present invention and illustrates the communication and operation of the components of fire suppression system upon detection of a potential fire hazard. As shown, sensor devices 20 can be in electrical communication with control assembly 18, battery assembly 16 and/or release devices 54 of fire extinguishing containers 14 (and/or distribution outlets 52 depending on the configuration of fire extinguishing containers 14). Depending on the particular configuration of fire suppression system 10, upon the detection of smoke and/or heat, sensor devices 20 can send a signal directly to release devices 54 of fire extinguishing containers 14 to direct the activation and release of fire extinguishing material from distribution outlets 52 for each fire extinguishing container 14. Alternatively, sensor devices 20 can be configured to send a signal to control assembly 18, which in turn controls the operation of release devices 54. Once release devices 54 are triggered by signal from sensor devices 20 and/or control assembly 18, the fire extinguishing material can be discharged from fire extinguishing containers 14 and exit case 12 through the adjacent distribution baffles located on the outer panels 22-32 of case 12. Upon exiting case 12 the fire extinguishing material can enter the fire zone 100 (such as a ULD) and operate to suppress and/or extinguish the fire hazard occurring within the fire zone 100.

In addition, the discharge of fire extinguishing material from fire suppression system 10 can cause a slight increase in pressure within the fire zone 100 and produce turbulence within the air in the fire zone 100 and force a combination of smoke (from the fire hazard in the fire zone 100) and the fire extinguishing material to escape the fire zone in order to alarm and/or alert operators and systems outside of the fire zone 100 (such as a ULD) of a potential fire hazard within the fire zone 100. According to certain embodiments, fire suppression system 10 can be configured such that the discharged fire extinguishing material can escape the fire zone 100 and on its own trigger the external alarm systems and/or operators located outside of the fire zone 100, even if no smoke from the fire hazard exits the fire zone 100.

For example, the cargo compartments in many aircraft carriers include photoelectric-type smoke detectors that are designed to detect smoke particles of a certain size. The fire extinguishing material utilized in fire suppression system 10 can be configured as an aerosol-based agent (or other suitable material) with a particle size detectable by the photoelectric-type smoke detectors in the aircraft cargo compartment. According to this embodiment, in the event fire suppression system 10 is activated, the discharged fire extinguishing material can trigger these photoelectric-type smoke detectors upon exiting the fire zone 100 (such as a ULD located in the cargo compartment) due to the particle size of the fire extinguishing material. The result of this configuration is an embodiment that can have the dual purpose of suppressing the fire hazard within the fire zone 100 and notifying the alarm systems and operators outside of the fire zone 100 of a potential fire hazard.

FIG. 8 provides a schematic representation of an alternative embodiment of fire suppression system 100 in which fire suppression system 10 further includes a smoke generating component 56 configured to produce and release a large amount of smoke that can be dispersed outside of the fire zone 100 (such as a ULD) in order to alarm and/or alert operators and systems outside of the fire zone 100 (such as a ULD) of a potential fire hazard within the fire zone 100. For example, on cargo aircraft and other transport vehicles, the cargo holds used for storing ULDs are typically configured with smoke detectors and/or other fire detection systems that alarm the crew and operators of a potential fire hazard in the cargo hold. As best shown in FIG. 8, smoke generating component 56 can include a smoke container 58 configured to hold a volume of a smoke generating agent that can produce smoke when dispersed from container 58. The smoke generating agent can comprise any suitable smoke producing agent now known or hereinafter developed, including without limitation, an aerosol-based chemical agent. As further shown in FIG. 8, smoke generating component 56 can be housed within a smoke generating compartment 38*d* defined within the interior of case 12 by one or more partition panels 36.

As shown in FIG. 8, smoke generating container 58 can further include a distribution outlet 60 and associated release device 62 (such as a squib component, servo control, thermal bulb or other suitable mechanism) connected to sensor devices 20 or control assembly 18 through electrical or electronic connections. Similar to fire extinguishing containers 14 as described herein, upon the detection of a potential fire hazard by sensor devices 20, sensor devices 20 and/or control assembly 18 can send a signal to release device 62 to trigger the activation of smoke generating container 58 and the release of the smoke generating agent through distribution outlet 60. As shown in FIGS. 8 and 10, smoke generating component 56 can additionally include an exit conduit 64 extending through case 12 and outside of fire zone 100 (such as through wall W as illustrated in FIG. 10) so that fire suppression system 10 can release the smoke generating agent outside of the fire zone 100 (such as a ULD) upon the detection of a potential fire hazard within the fire zone. In an alternative embodiment, exit conduit can alternatively be configured to extend only though case 12 so that the smoke generating agent can exit case 12 into fire zone 100 and then subsequently exit fire zone 100 through a door, vent or exit means in order to alarm and/or alert operators and systems outside of the fire zone 100. In addition, according to another alternative embodiment, smoke generating component 56 can be separated from the remainder of fire suppression system 10 and externally located with respect to fire zone 100. According to such an embodiment, control assembly 18 can be configured to signal smoke generating component 56 to discharge the smoke generating agent from smoke container 58 outside of fire zone 100 upon the detection of a potential fire hazard within fire zone 100 in order to alarm and/or alert operators and systems outside of the fire zone 100.

As described above, the discharge of fire extinguishing material from fire extinguishing containers 14 can cause smoke from the fire hazard along with some of the discharged fire extinguishing material to exit a fire zone 100 (such as a ULD), which can set off the alarm systems within a cargo hold. In addition, as also described above, the discharged fire extinguishing material on its own can be configured to set off the alarm systems even if no smoke from the fire zone 100 escapes. Further, according to certain embodiments, the incorporation of smoke generating component 56 in fire suppression system 10 can provide a more direct means to distribute a smoking agent to set the alarm systems in the cargo hold and communicate to the crew the presence of a fire hazard. This can be particularly beneficial when used in connection with non-fire resistant ULDs, which can provide only about 8-10 minutes of fire resistance (as opposed to fire resistant ULDs which can provide 4 hours or more of fire resistance).

Referring now to FIGS. 9-10, the operation of fire suppression system 10 in connection with a fire zone 100 is described in greater detail. FIGS. 9-10 illustrate fire suppression system 10 in use with a fire zone 100 configured as a ULD used in connection with cargo transport in airplanes; however, it is recognized that fire suppression system 10 can suitably be used in any number of different types of fire zones 100 as described herein. As described above, fire suppression system 10 can be positioned within the ULD 100 (by mounting to the ceiling or otherwise) and placed into the "on" position to enable fire suppression system (via control assembly 18 and sensors 20) to passively monitor the conditions within the ULD 100 to detect the presence of a potential fire hazard. Upon detection of smoke, heat, and/or other characteristic of a potential fire hazard, sensor devices 20 can send a signal to control assembly 18 or directly to release devices 54 of fire extinguishing containers 14 depending upon the configuration of fire suppression system 10. The signal sent by sensor devices 20 can trigger the release the fire extinguishing material from fire extinguishing containers 14. The fire extinguishing material is discharged from fire suppression system 10 and can function to (i) suppress the fire hazard in ULD 100 and (ii) exit the ULD 100 through an exit (such as a door, vent, or other opening) along with smoke from the fire hazard in order to set off fire/smoke detection systems outside the ULD 100 to alert the crew of the fire hazard. Additionally, sensor devices 20 or the control assembly 18 may send a signal directly to the crew of the airplane or other transport vehicle to notify them of the presence of smoke and/or heat, operation of the system 10, or status of system 10.

Further, in certain embodiments of the present invention, fire suppression system 10 can be equipped with a manual activation switch that can be wired to control assembly 18 and located on the exterior of case 12 to enable to manual activation of fire suppression system 10. The manual activation switch may also be configured as a remote switch that is located away from exterior case 12 and physically wired to control assembly 18 or connected to control assembly 18 by a wireless communications means in order to enable an operator to trigger the activation of fire suppression system 10 manually without having to be in the direct proximity of fire zone 100.

As further shown in FIGS. 9-10, once distribution outlets 54 are triggered, the fire extinguishing material can exit fire extinguishing containers 14 and travel through the discharge baffles 34 located along the outer panels 22-32 of case 12, where the fire extinguishing material can enter the fire zone 100 and operate to suppress and/or extinguish the fire hazard located therein. As shown in FIGS. 9-10, the discharge baffles can be configured to direct the fire extinguishing material in any suitable or desired spray pattern, direction or orientation.

As further shown specifically in FIG. 10, according to the embodiment of fire suppression system 10 schematically illustrated in FIG. 8, sensor devices 20 can be configured to send a signal to smoke generating component 56 (via release device 62) upon the detection of a potential fire hazard within fire zone 100 (such as a ULD). As described previously, sensor devices 20 can also or alternatively be configured to send a signal to control assembly 18, which can in turn send a signal to release device 62. When release device 62 receives the signal from sensor devices 20 and/or control assembly 18, release devices 62 can activate smoke generating container 58 and cause the release of the smoke generating agent from distribution outlet 60 of smoke generating container 58. The smoke generating agent can then travel through exit conduit 64 extending through case 12 and the outer wall W of the fire zone 100 and be dispersed outside of fire zone 100, where it can alarm and/or alert operators and systems outside of the fire zone 100 (such as a ULD) of a potential fire hazard within the fire zone 100.

Figure 11:
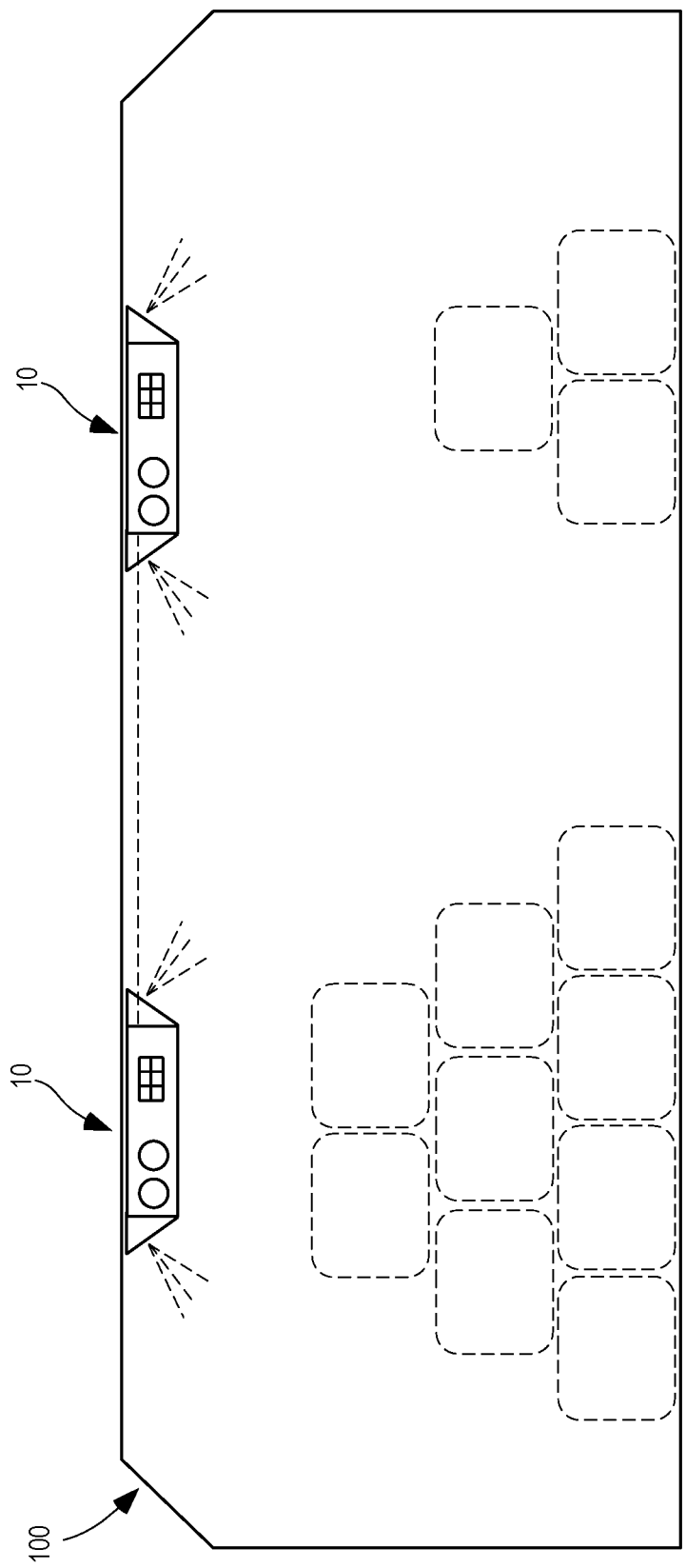
FIG. 11 is a schematic view of multiple fire suppression systems in operation within a fire zone in accordance with one embodiment of the present invention.

Referring now to FIG. 11, according to certain embodiments of the present invention, fire suppression system 10 can be configured to communicate with additional fire suppression systems 10' located within a single fire zone 100. FIG. 11 illustrates a fire zone 100 containing a first fire suppression system 10 and a second fire suppression system 10', each mounted within fire zone 100. In such an embodiment, each fire suppression system 10 and 10' can be configured to communicate with the other (either by physical electronic wiring for two-way communication or wireless communication means) so that in the event one of the fire suppression systems 10 or 10' detects the presence of a potential fire hazard (via sensor devices 20), both fire suppression systems 10 and 10' trigger the discharge of the fire extinguishing material from fire extinguishing containers 14 into fire zone 100. In such a configuration, the control assembly 18 of the fire suppression system 10 or 10' that detects the presence of a potential fire hazard can be configured to transmit a signal to the other fire suppression system 10 or 10' and trigger the discharge of fire extinguishing material from both fire suppression systems 10 and 10'. Such an embodiment can be particularly utilized in situations where fire zone 100 has a larger volume (such as large storage facilities or long shipping containers) in order to enable greater coverage of fire suppression system 10 within fire zone 100. While FIG. 11 illustrates only two fire suppression systems 10 and 10' located within fire zone 100, it is recognized that any number of additional fire suppression systems 10 can be placed within fire zone 100 depending on the particular size of fire zone 100.

Referring now to FIG. 12, according to certain embodiments of the present invention, fire suppression system 10 can be configured to communicate with additional fire suppression systems 10' located in separate fire zones 100'. FIG. 12 illustrates a first fire suppression system 10 located within a first fire zone 100 and a second fire suppression system 10' located within a second fire zone 100'. In such an embodiment, each fire suppression system 10 and 10' can be configured to communicate with the other (either by physical electronic wiring or wireless communication means) so that in the event one of the fire suppression systems 10 or 10' detects the presence of a potential fire hazard (via sensor devices 20) within its corresponding fire zone 100 or 100', the fire suppression system 10 or 10' that detects the potential fire hazard can transmit a signal to the other fire suppression system 10 or 10' so that both fire suppression systems 10 and 10' trigger the discharge of the fire extinguishing material within their respective fire zones 100 and 100'. Such an embodiment can be particularly utilized in situations where multiple individual fire zones 100 and 100' are located together (such as multiple ULDs located within a cargo compartment of an aircraft or transport, or in a storage facility with multiple compartments). While FIG. 12 illustrates only two fire zones 100 and 100', each having its own respective fire suppression system 10 and 10', it is recognized that such a configuration can incorporate additional fire suppression systems 10 with and number of additional individual fire zones 100 depending on the particular application.

Fire suppression system 10, according to certain embodiments of the present invention, can further be configured to communicate with systems and equipment located outside of fire zone 100. According to one embodiment, fire suppression system 10 can be connected to an external power source (such as the electrical system of an aircraft or transport, or a solar panel or alternative power source) in order to function as a secondary or backup power source to ensure the continued operation of fire suppression system 10 within fire zone 100 in the event of a malfunction of battery assembly 16 or in the event battery assembly 16 extinguishes its charge. According to another embodiment, fire suppression system 10 can be configured to communicate with an alarm system or communication system located outside of fire zone 100 in order to enable fire suppression system 10 to communicate the status of fire suppression system 10 and/or fire zone 100 to systems, equipment and operators outside of fire zone 100.

Fire suppression system 10 can also be configured with additional components located remotely from case 12 within fire zone 100 depending on the particular arrangement and application of fire suppression system 10. For example, in certain embodiments, fire suppression system 10 can be configured with additional sensor devices 20 that are positioned at various locations within fire zone 100 in order to enable fire suppression system 10 to more quickly detect the presence of a potential fire hazard within the fire zone 100. Such additional sensor devices 20 can be connected to control assembly 18 (and/or the other components of fire suppression system 10 as described above) by means of physical wiring or wireless communications means and operate in the same manner as the sensor devices 20 mounted to case 12.

There several other functionalities that may be incorporated into the various embodiments of the fire suppression of the present invention including: a disarm device that renders the device safe and prevents its operation; a monitoring device that allows for remote control or monitoring of the status and operation of the device using a computer, display device or hand-held device wherein the monitoring device is configured to indicate the conditions and/or status of system 10, which may include whether or not the device has discharged, a fire is sensed, or the pressures and other conditions of the propellant or liquid foam.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

The invention claimed is:

1. A fire suppression system for use in a fire zone, said fire suppression system comprising:
   a case comprising at least one panel and a case interior;
   at least one fire extinguishing container positioned within said case interior and configured to hold a volume of a fire extinguishing material;
   a control assembly positioned within said case interior and comprising a removable control unit;
   a battery assembly positioned within said case interior and comprising a removable battery unit;
   a sensor device mounted to said case, said sensor device configured for detecting the presence of a potential fire hazard within said fire zone;
   a smoke generating component located within said case interior, wherein said smoke generating component comprises a smoke generating container configured to hold a volume of a smoke generating agent, a smoke distribution outlet configured to discharge said smoke generating agent from said smoke generating container, and a smoke release device configured to activate said smoke distribution outlet, wherein said smoke release device is electrically connected to at least one of said sensor device and said control assembly; and
   an exit conduit having a first end located within said case interior and adjacent to said distribution outlet of said smoke generating container and a second end located outside said fire zone;
   wherein said sensor device is electrically connected to said at least one fire extinguishing container, said control assembly and said battery unit;
   wherein upon the detection of a potential fire hazard, said at least one fire extinguishing container is configured to release said fire extinguishing material into said fire zone;
   wherein said smoke generating component is configured to release said smoke generating agent upon detecting the presence of heat and/or smoke within said fire zone and disperse said smoke generating agent outside of said fire zone.

2. The fire suppression system of claim 1, further comprising at least one partition panel provided within said case interior, wherein said partition panel defines a control assembly compartment housing said control assembly, a battery assembly compartment housing said battery assembly, and a fire extinguishing compartment housing said at least one fire extinguishing container.

3. The fire suppression system of claim 1, wherein said battery assembly further comprises a battery box configured to hold said removable battery unit and a thermal insulating material provided at least partially around said battery box.

4. The fire suppression system of claim 3, wherein said case comprises a first side panel, wherein said battery assembly is positioned adjacent said first side panel, and wherein said removable battery unit is selectively removable from said battery box through said first side panel.

5. The fire suppression system of claim 4, wherein said case comprises at least one partition panel located in said case interior, wherein said at least one partition panel and said first side panel defines a battery assembly compartment within said case interior, and wherein said at least one partition panel includes a thermal insulating material provided thereon within said battery assembly compartment.

6. The fire suppression system of claim 1, further comprising a distribution outlet located on said at least one fire extinguishing container, said distribution outlet configured to release said fire extinguishing material.

7. The fire suppression system of claim 1, further comprising a release device provided on said at least one fire extinguishing container, wherein said release device is electrically connected to at least one of said sensor device and said control assembly, and wherein upon the detection of the presence of heat and/or smoke by said sensor device, said release device triggers a discharge of said fire extinguishing material from said at least one fire extinguishing container.

8. The fire suppression system of claim 1, wherein said fire extinguishing material is configured to set off an external fire protection alarm device located outside of said fire zone upon the exit of said fire extinguishing material from said fire zone following discharge from said at least one fire extinguishing container.

9. The fire suppression system of claim 1, further comprising a second exit conduit configured to facilitate the disbursement of said smoke generating agent into said fire zone upon the detection of the presence of heat and/or smoke within said fire zone.

10. The fire suppression system of claim 1, further comprising a first side panel have a distribution baffle located thereon, wherein said at least one fire extinguishing container includes a distribution outlet, and wherein said distribution outlet of said at least one fire extinguishing container is positioned adjacent to said distribution baffle.

11. The fire suppression system of claim 10, wherein said distribution baffle is configured to alter the direction of said fire extinguishing material as it exits said case.

12. The fire suppression system of claim 1, wherein said at least one fire extinguishing container comprises a first fire extinguishing container, a second fire extinguishing container, and a third fire extinguishing container.

13. The fire suppression system of claim 1, wherein said control assembly is configured to monitor a power level of said removable battery unit.

14. The fire suppression system of claim 1, wherein said control assembly is configured to monitor the continuity of the electrical connection between said sensor device, said battery assembly and said at least one fire extinguishing container.

15. A removable fire suppression system for use in a fire zone having a wall at least partially defining a perimeter of said fire zone, said removable fire suppression system comprising:
   a case comprising a bottom panel, first and second side panels and first and second end panels defining a case interior;
   at least one partition panel defining a battery assembly compartment, a control assembly compartment and a fire extinguishing compartment;
   a fire extinguishing container removably secured within said fire extinguishing compartment, said fire extinguishing container including a volume of fire extinguishing agent therein and a distribution outlet located at one end of said fire extinguishing container;
   a control assembly located within said control assembly compartment, said control assembly comprising a control unit located adjacent said first end panel and selectively removable through said first end panel;

a battery assembly located within said battery assembly compartment, said battery assembly comprising a battery box and a battery unit, wherein said battery assembly is located adjacent said first side panel and said battery unit is selectively removable from said battery box through said first side panel;

a sensor device mounted to an exterior side of said first end panel, said sensor device electrically connected to said control assembly, said battery assembly, and said fire extinguishing container;

a distribution baffle located on said second end panel, wherein said distribution outlet of said fire extinguishing container is located adjacent said distribution baffle to enable said fire extinguishing material to exit said case; and a smoke generating component located within a smoke generating compartment defined within said case interior, wherein said smoke generating component includes a smoke generating container having a volume of smoke generating agent located therein, a smoke distribution outlet configured to discharge said smoke generating agent from said smoke generating container upon a signal from said sensor device, and an exit conduit having a first end located within said case interior and adjacent said smoke distribution outlet and a second end located outside of said fire zone, said exit conduit extending beyond an exterior of said case and said wall of said fire zone to discharge said smoke generating agent outside of said fire zone;

wherein said sensor device is configured to detect the presence of smoke and/or heat within said fire zone, and upon the detection of heat and/or smoke, said sensor device is configured to send a signal to said fire extinguishing container to trigger the release of said distribution outlet and exit of said fire extinguishing material; and wherein upon the detection of heat and/or smoke by said sensor device, said smoke generating agent is discharged from said smoke generating container.

16. The removable fire suppression system of claim 15, further comprising a second fire extinguishing container located within said fire extinguishing compartment, said second fire extinguishing container including a second distribution outlet, wherein said second distribution outlet is positioned adjacent to said second side panel.

17. The removable fire suppression system of claim 16, further comprising a third fire extinguishing container located within said fire extinguishing compartment, said third fire extinguishing container including a third distribution outlet, wherein said third distribution outlet is positioned adjacent to said first side panel.

* * * * *